United States Patent [19]

Moore

[11] E Re. 31,316

[45] Reissued Jul. 19, 1983

[54] ELONGATED IGNITING DEVICE

[76] Inventor: Robert W. Moore, 449 E. Altgeld Ave., Glendale Heights, Ill. 60137

[21] Appl. No.: 367,381

[22] Filed: Apr. 12, 1982

Related U.S. Patent Documents

Reissue of:

[64] Patent No.: 4,315,731
Issued: Feb. 16, 1982
Appl. No.: 242,362
Filed: Mar. 10, 1981

[51] Int. Cl.[3] ..... F23Q 1/04

[52] U.S. Cl. ..... 431/254; 431/274; 431/345

[58] Field of Search ..... 431/143, 254, 274, 275, 431/345

[56] References Cited

U.S. PATENT DOCUMENTS

| | | | |
|---|---|---|---|
| 3,520,647 | 7/1970 | Van Poppel | 431/275 |
| 4,253,820 | 3/1981 | Jarreau | 431/345 |
| 4,259,059 | 3/1981 | Roosa et al. | 431/254 |

*Primary Examiner*—Carroll B. Dority, Jr.

[57] ABSTRACT

An elongated shank has a handgrip at the rear end portion. At the forward end portion there is a holder for releasably retaining a cigarette lighter of the throw-away gas or butane type having a conventional flint wheel and a gas valve actuator. An actuator rod is guided for reciprocable sliding movement along the shank. The rod is urged forward along the shank by a biasing spring and may be pulled backward against the spring by a trigger adjacent the handgrip. An integral outer extension of the rod, forward of the holder, is movable between extended and retracted positions by the biasing spring and the trigger, respectively. An elastic friction member, consisting of a backwardly extending, cantileverly supported, diagonally oriented coil spring is mounted on the outer extension and is movable backward by the trigger to engage and rotate the flint wheel and depress the valve actuator. This ignites the lighter and holds it ignited as long as the trigger is held. The device is adapted for lighting pilot lights of gas appliances, candles, fireplaces, barbecue grills, camping lights and stoves, and the like.

15 Claims, 10 Drawing Figures

ELONGATED IGNITING DEVICE

Matter enclosed in heavy brackets [ ] appears in the original patent but forms no part of this reissue specification; matter printed in italics indicates the additions made by reissue.

BACKGROUND OF THE INVENTION

This invention is an improvement in disposable cigarette lighters commonly called "gas" or "butane" type lighters. Several of these are on the market under various trade names such as "BIC", "CRICKET", "RONSON" and "SCRIPTO". Typically, they have a plastic body about three inches long containing liquid butane fuel, and a head end with a rotatable flint wheel adjacent a movable valve actuator controlling flow of fuel gas to an outlet port.

The flint wheel and the valve actuator are at one side of the head end and positioned so both can readily be manipulated by a user's thumb. The valve associated with the actuator is normally closed by a spring inside the head. The user must hold his thumb on the valve actuator to keep the valve open and the lighter lit.

While these lighters are classified as cigarette lighters, they are used for other lighting purposes such as for pilot lights and burners in stoves, ovens and water heaters, and gasoline and kerosene lamps and heaters, to name a few. The lighting of such a burner inside an enclosure, and particularly the lighting of an oven burner for a domestic gas stove or a main burner of a gas furnace or water heater is a risky procedure due to the necessary location of the burner at a point spaced from the door or opening through which the operator's hand must extend if he holds a lighted [ciragette] *cigarette* lighter or match and extends it into the stream of gas to be ignited.

Unburned gas can collect inside the housing of such an appliance when the pilot and burner have been off. Furthermore, gas burners are usually in multiple units spaced from side to side relative to one another, with the result that the burner units remote from the ignition point emit a large amount of combustible gas before the flame reaches it, resulting in an explosion which, even though minor, may be sufficient to ignite the operator's clothing or singe his hand and clothing.

This situation therefore is in need of improvement to enable a person to operate a cigarette lighter remotely to avoid this kind of risk.

SUMMARY OF THE INVENTION

It is a general object of the present invention to provide an elongated igniting device for a conventional gas or butane cigarette lighter by supporting it at the end of an elongated shank so it may be utilized to ignite gas utilities such as ovens, furnaces and water heaters, and fireplaces, barbecue grills, camping lights and stoves, and the like, at positions safely remote from the hand of the user.

Another object is to provide such an elongated igniting device having an elongated shank with a hand grip and a holder for a cigarette lighter on opposite end portions thereof, an actuator rod guided for reciprocable movement parallel to the shank, a trigger for pulling the actuator rod rearwardly against a biasing spring, and an igniting element on an outer extension of the actuator rod effective in response to movement of the rod by the trigger to rotate the lighter flint wheel and depress the lighter valve [acutator] *actuator* to ignite the lighter and hold it ignited.

Another object is to provide such an elongated igniting device in which the igniting element includes an elastic friction member engageable with an off center portion of the flint wheel to rotate the wheel.

Another object is to provide such an elongated ignition device in which the elastic friction member is a coil spring friction member cantileverly mounted on the outer extension of the actuator rod and having a free end facing backwardly toward the head end of the lighter and aligned with the flint wheel and valve actuator along the line of movement of the coil spring friction member.

Another object is to provide such an elongated ignition device in which the free end of the coil spring friction member engages both the rim of the flint wheel to generate sparks and the valve actuator to hold it in open position in response to a single backward movement of the actuator rod by the trigger.

Another object is to provide such an elongated igniting device in which the coil spring friction member is mounted diagonally relative to its line of movement toward the lighter making possible an ignition sequence in which the free end of the coil spring initially engages the rim of the flint wheel to start rotating it, then shifts laterally enabling the side of the spring to engage the flint wheel and continue rotating it, followed by pressing the free end of the spring against the valve actuator to hold it open.

Another object is to provide such an elongated igniting device in which the coil spring friction member is supported on a core which is elastic enabling the coil spring friction member to deflect laterally after engaging the rim of the flint wheel, thereby rotating the flint wheel by an initial engagement with the free end of the coil spring friction member followed by a subsequent engagement with the side of the coil spring friction member.

Another object is to provide such an elongated igniting device in which the holder has an elastic yoke retainer for the head end of the lighter enabling the lighter to deflect laterally after the coil spring friction member engages the rim of the flint wheel, thereby rotating the flint wheel by an initial engagement with the free end of the coil spring friction member followed by engagement with the side thereof.

Another object is to provide such a device in which the core supporting the coil spring friction member is a cantilever member with a free end engageable with the valve actuator to hold the fuel valve open when the actuator rod is held retracted by the trigger.

Another object is to provide such a device in which at least the free end of the coil spring has some axially compressible coils which compress on initial engagement with the flint wheel and which subsequently expand when it shifts laterally enabling the compressed spring coils to expand and thereby facilitate rotation of the flint wheel.

BRIEF DESCRIPTION OF THE DRAWINGS

Other objects and advantages will be apparent from the following description taken in connection with the accompanying drawings in which.

Like parts are referred to by like reference characters throughout the figures of the drawing.

DETAILED DESCRIPTION OF THE PREFERRED EMBODIMENT

Figures 1, 2, 3, 4, 5, 6, 7, 8, 9, 10:
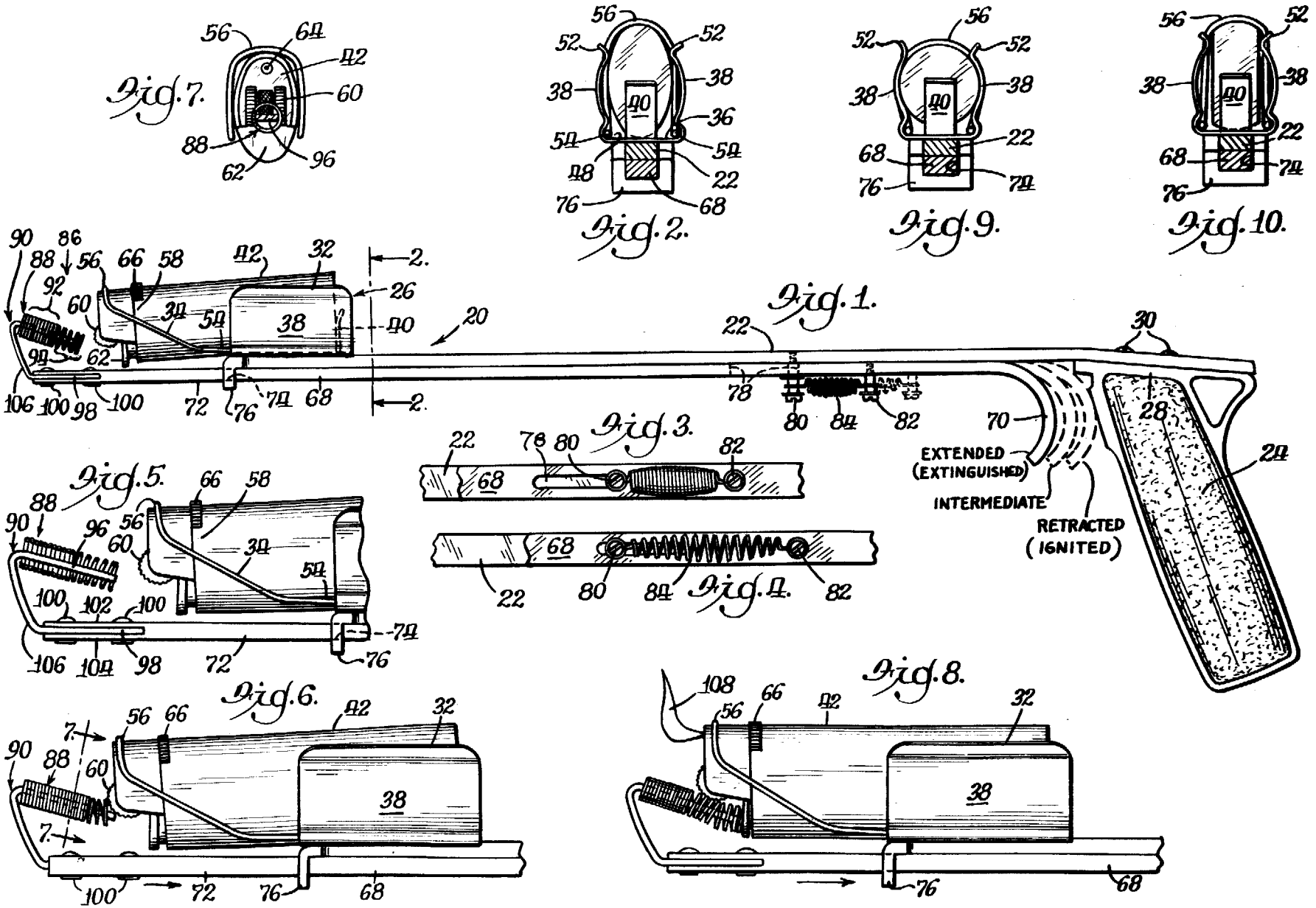
FIG. 1 is a side view in extended (extinguished) mode condition of an elongated igniting device employing the principles of the present invention.
FIG. 2 is a vertical sectional view of FIG. 1 taken along line 2—2.
FIG. 3 is a fragmentary bottom view of FIG. 1.
FIG. 4 is a view similar to FIG. 3 in retracted (ignited) operating mode condition.
FIG. 5 is a fragmentary view of FIG. 1 with the coil spring friction member cross-sectioned to expose the internal leaf spring which supports it.
FIG. 6 is a fragmentary view of the device shown in FIG. 1 in a position intermediate the extended and retracted (extinguished and ignited mode) conditions.
FIG. 7 is a fragmentary cross-sectional view of FIG. 6 taken on line 7—7.
FIG. 8 is a view similar to FIGS. 5 and 6 showing the device in retracted (ignited) mode condition.
FIG. 9 is a view similar to FIG. 2 showing the device used with a round cross-section conventional cigarette lighter.
FIG. 10 is another view similar to FIG. 2 showing the device used with a generally rectangular cross-section conventional cigarette lighter.

Referring now to the specific embodiment of the invention shown in the drawings, the elongated lighting device is generally designated 20. It has an elongated shank 22 consisting of a rectangular cross-section rod with a hand grip 24 at the rear end portion and a holder 26 at the forward end portion for releasably retaining a cigarette lighter of conventional design. The hand grip has a frame 28 fastened to the shank 22 in any suitable way, as by screws 30.

The holder 26 is formed in a shape enabling it to hold a variety of different cross-section throwaway cigarette lighters which are widely available. It has an elastic body 32 formed from flat spring stock and a forwardly extending elastic yoke 34 formed from wire spring stock. The body 32 has a flat base 36 and two similar upstanding sidewalls 38, 38. A backwall 40 extends upwardly from the base to limit backward movement of a cigarette lighter 42 when retained in the holder. The sidewalls are indented to provide a pair of lower rounded inside recesses 48 of relatively small radius, a pair of upper rounded recesses 50, 50 of larger radius, and outwardly flared upper edges 52, 52. The base 36 may be fastened atop the shank 22 by any suitable means such as spot welding or brazing. The spring wire yoke 34 is generally U-shaped. Its end portions 54, 54 are fastened as by spot welding or brazing in the lower recesses 48, 48, and it has a forwardly -and upwardly-extending bridle portion 56 formed to hold down the head end portion of the lighter 42.

The holder 26 shaped as described above enables it to releasably retain any one of several standard, readily available lighters. These are, typically, about three and one-eighth inches long and have a head end portion 58 with a serrated flint wheel 60, a valve actuator 62 which controls flow of fuel gas through an outlet port 64, and a flow regulating wheel 66 which determines the height of the flame. The flint wheel 60 and valve actuator 62 are always positioned adjacent to one another and in the same general relationship so a user can turn the flint wheel and depress the valve actuator simultaneously in a [signle] *single* motion of the thumb to ignite the lighter with a simple one-hand operation.

All lighters intended for use in the present invention will have flint wheels and valve actuators in the same general arrangement as shown in FIG. 1, and their body lengths will be substantially the same, although their individual cross-sections will vary somewhat. The oval cross-section lighter 42 shown in FIGS. 2 and 7 is marketed under the trademark "BIC". Round cross-section lighters 42a, as shown in FIG. 9, are marketed under the trademarks "CRICKET" and "RONSON". And generally rectangular cross-section lighter 42b, as shown in FIG. 10, are marketed under the trademark "SCRIPTO".

A rectangular cross-section actuator rod 68 is guided for reciprocable movement parallel to the shank 22. It has a downwardly and forwardly curved trigger 70 at the rear end adjacent the hand grip 24 and an outer extension portion 72 at the front end beyond the head end portion 58 of the lighter. The actuator rod 68 is reciprocably journaled for forward and backward movement through a rectangular-shaped eye 74 in a down-turned tab 76 at the forward end of the shank 22. Rearwardly of the tab, the actuator rod has an elongated through-slot 78 (FIGS. 3 and 4). A pin 80 extends upwardly through the slot and is threadedly engaged with the shank. Another pin 82 is threadedly engaged with the actuator rod 68. A biasing spring 84 is tensioned between the pins to urge the actuator rod 68 in a forward direction to the extended position shown in FIGS. 1, 3 and 5. A pull on the trigger 70 moves the actuator rod in a backward direction through the intermediate position shown in FIG. 6, and further pull on the trigger moves the actuator rod to the fully retracted position shown in FIGS. 4 and 8. The fully retracted position of the spring 84 and trigger 70 is also shown in broken lines in FIG. 1.

Igniting means generally designated 86 is supported on the outer extension portion 72 of the actuator rod 68. This functions as a sort of substitute or "mechanical" thumb which rotates the flint wheel 60 and depresses the valve actuator 62 in response to pull on the trigger 70. It comprises an elastic friction member consisting of a coil spring 88 mounted on the end of a cantileverly mounted core member 90 formed from flat metal strap or spring stock.

More specifically, the coil spring friction member 88 shown is cylindrical, with a plurality of abutting coils at the forward end portion 92, and a plurality of relatively loosely wound, compressible coils at the free, rear end portion 94. Because of the arrangement described, the coil spring 88 is thereby cantileverly mounted on a flat core which comprises in this case the free end portion or arm 96 of the member 90, the opposite end portion 98 being fastened by rivets 100 within the space between upper and lower leaves 102 and 104 of the bifurcated forward end portion of actuator rod extension 72. The member 90 is here shown as an elastic member, made from flat spring steel stock. Alternatively, if desired, it may be relatively stiff and operate by transverse movement of the lighter within the constraints of the elastic yoke 34.

The free arm portion 96 of leaf spring member 90 is backwardly and downwardly inclined and is connected to the fixed end portion 98 by an intermediate section 106. It supports the free end of the coil spring 88 at a proper level to engage the serrated rim of the flint wheel 60 below its center (as shown in FIG. 6) when the actuator rod 68 is pulled backward by the trigger. This initial offcenter engagement of the flint wheel is shown in FIG. 6 which represents an intermediate mode condition between the extended (extinguished) and retracted (ignited) mode conditions shown in FIGS. 1 and 8 respectively.

Further pull of the trigger from the intermediate position (FIG. 6) rotates the flint wheel counterclockwise. Initially, this is caused by endwise engagement of the coil spring with the rim of the flint wheel below its center, followed by bodily downward displacement of the coil spring friction member 88 and its elastic core 96, and upward displacement of the lighter permitted by the elastic yoke 34, causing further rotation as the outer surface of the spring coils act as teeth engaging the serrations on the wheel rim. As the free end of the coil spring friction member 88 approaches a position of tangency with the flint wheel (about half-way between the FIGS. 6 and 8 positions), the normally-separated coils at the rear end portion 94 compress. Beyond that point, they rapidly expand, increasing the rotational speed of the flint wheel to facilitate generation of sparks.

In the fully retracted (ignited) mode condition shown in FIG. 8, both the free end portion 96 of the leaf spring member and the end of coil spring friction member 88 engage the valve actuator 62 and combine to hold the valve (not shown) open and maintain the flame 108. Alternatively, either the leaf spring member 90 or coil spring friction member 88 may hold the valve actuator open in the ignited mode condition.

The device may be made in any convenient length, in fact, it may be made several feet long. Typically, however, an all-purpose igniting device as shown and described preferably will have an overall length of fifteen to twenty inches and can serve a wide variety of remote utility igniting uses for restarting pilots and main burners in gas ovens, furnaces and water heaters.

Use and operation will be apparent from the above description. Briefly, however, any one of a variety of readily available throwaway lighters may be placed in the holder 26 with the body portion gripped between the spring sidewalls 38, 38 and with the head end portion 58 held down by the bridle portion 56 of the yoke 34. Then, after placing the device with its front end extending into the appliance housing adjacent the stream of gas to ignited, all the operator need do is pull the trigger to produce a flame at the exact point of need. One substantial advantage of this invention is that, even if the fuel is so low that pulling the trigger fails to ignite the ligher, the sparks generated by the flint wheel will themselves ignite the gas in the appliance.

While one form in which the present invention may be embodied has been shown and described, it will be understood that various modifications may be effected without departing from the spirit and scope of the invention as defined by the appended claims. For example, the spring members 88 and 90 may take many specifically different forms, and the hand grip frame 28 may be formed integrally with either the shank 22 or actuator rod 68 or both.

The embodiment of the invention in which an exclusive property or privilege is claimed are defined as follows:

1. An elongated igniting device for a conventional cigarette lighter having a head end with a rotatable flint wheel adjacent a movable valve actuator controlling flow of fuel through a valve to an outlet port, said device comprising:

an elongated shank;

a handgrip on one end portion of said shank;

holding means on the opposite end portion of said shank for releasably retaining the cigarette lighter with the head end facing away from the hand grip;

an actuator rod guided for reciprocable movement parallel to said shank, said rod having an outer extension beyond the head end of the lighter and being movable between extended and retracted mode conditions relative to the lighter head end;

spring means biasing said actuator rod toward its said extended mode condition;

trigger means adjacent the hand grip and connected to the actuator rod, effective in response to pull on the trigger, to move said actuator rod to said retracted mode condition against the bias of said spring; and igniting means supported on said outer extension in position to engage and rotate the rim of said flint wheel and depress said valve actuator to ignite the lighter in response to movement of the actuator rod to its said retracted mode condition.

2. An elongated igniting device according to claim 1 in which the igniting means includes an elastic friction member engageable with the flint wheel rim offcenter.

3. An elongated igniting device according to claim 2 in which the elastic friction member is a cantileverly mounted coil spring friction member having a free end facing the head end of the lighter and aligned with the flint wheel along the line of movement of the coil spring friction member.

4. An elongated igniting device according to claim 3 in which the coil spring friction member is positioned for its free end to engage both the rim of the flint wheel to generate sparks and to hold the valve actuator in open position responsive to movement of the actuator rod to its said *retracted* mode condition.

5. An elongated igniting device according to claim 3 in which the coil spring friction member is mounted diagonally relative to its line of movement with the actuator rod enabling an ignition sequence in which the free end of the coil spring friction member initially engages the rim of the flint wheel offcenter to start it rotating followed by laterally shifting to engage the flint wheel with the side of the coil spring friction member and generate sparks followed by engagement of the free end of the coil spring friction member with the valve actuator to maintain a flame.

6. An elongated igniting device according to claim 3 in which the coil spring friction member is supported on an elastic core enabling the spring to deflect laterally after engaging the rim of the flint wheel, thereby rotating the flint wheel by an initial engagement with the free end of the coil spring friction member followed by engagement with the side of the coil spring friction member.

7. An elongated igniting device according to claim 6 in which the elastic core is at least one leaf spring.

8. An elongated igniting device according to claim 6 in which the free end of the coil spring friction member engages the valve actuator to hold the fuel valve open when the actuator rod is in retracted mode condition.

9. An elongated igniting device according to claim 6 in which the elastic core is a cantilever member with a free end which engages the valve actuator to hold the fuel valve open when the actuator rod is in retracted mode condition.

10. An elongated igniting device according to claim 5 in which at least the free end of the coil spring friction member has compressible coils which compress on initial engagement with the flint wheel and which subsequently expand when it shifts laterally enabling the expanding coils to facilitate rotation of the flint wheel.

11. An elongated igniting device according to claim 5 in which the holding means includes elastic means urging the head end of the lighter toward the path of movement of the coil spring friction member thereby enabling the lighter to be shifted laterally by the coil spring friction member to facilitate igniting the lighter.

12. An elongated igniting device according to claim 11 in which the coil spring friction member is supported on a relatively rigid core member movable with said actuator rod.

*13. An elongated igniting device for a conventional cigarette lighter having a head end with a rotatable fling wheel adjacent a movable valve actuator controlling flow of fuel through a valve to an outlet port, said device comprising:*

*an elongated shank;*

*a handgrip on one end portion of said shank;*

*holding means on the opposite end portion of said shank for releasably retaining the cigarette lighter with the head end facing away from the hand grip;*

*an actuator rod guided for reciprocable movement parallel to said shank, said rod having an outer extension beyond the head end of the lighter and being movable between extended and retracted mode conditions relative to the lighter head end;*

*trigger means adjacent the hand grip and connected to the actuator rod, effective in response to pull on the trigger, to move said actuator rod to said retracted mode condition; and*

*igniting means supported on said outer extension in position to engage and rotate the rim of said flint wheel and depress said valve actuator to ignite the lighter in response to movement of the actuator rod to its said retracted mode condition.*

*14. An elongated igniting device according to claim 13, in which the igniting means includes an elastic friction member engageable with the flint wheel rim.*

*15. An elongated igniting device according to claim 13 in which the igniting means includes a friction member mounted on a spring member and engageable with the flint wheel rim.*

* * * * *